July 7, 1931.  J. T. SUTLIFF  1,813,643
METER CONNECTION AND SUPPORT
Filed May 10, 1928
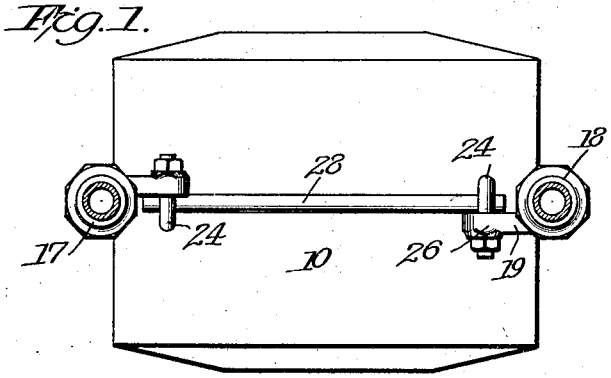
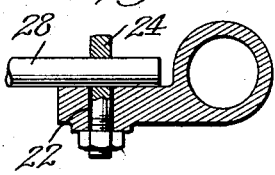
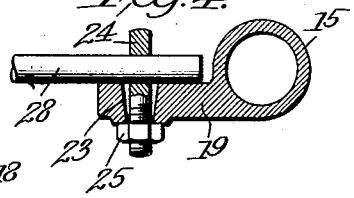
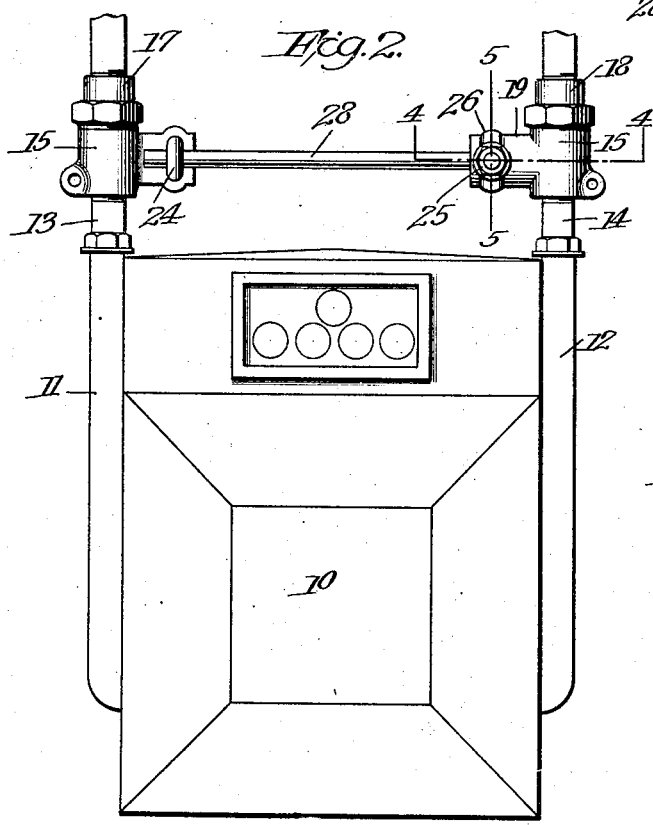
Inventor
James T. Sutliff
By Cushman, Byant Darby
Attorneys Patented July 7, 1931

1,813,643

UNITED STATES PATENT OFFICE

JAMES T. SUTLIFF, OF DECATUR, ILLINOIS, ASSIGNOR TO MUELLER CO., OF DECATUR, ILLINOIS, A CORPORATION OF ILLINOIS

METER CONNECTION AND SUPPORT

Application filed May 10, 1928. Serial No. 276,686.

The present invention relates to a meter connection and support and is particularly adapted for use in connection with gas meters.

It is well understood that there is considerable strain upon the supply pipes to which the usual meter is attached and since such strains frequently result in breakage of the connections, improvements of the present character are used to overcome any possibility of the resulting dangerous situation.

The present invention may be employed in connection with the usual stationary shelf or more particularly with a construction wherein the shelf is suspended from the connection itself.

In the installation of meters, frequently the connecting up of the meter pipes with the pipe from the main and the pipe to the house is made difficult by reason of the lack of alignment of the pipes, the longitudinal distance separating the pipes and, in many cases, the difference in length of the pipes.

Hence, it is an object of the invention to provide a connection and support which not only will relieve the strain, but which also will be adjustable to meet the various circumstances described.

For example, with the present invention inequalities in the length of the pipe may be overcome, lack of parallelism or difference in angular position will be compensated for and longitudinal adjustment will be accommodated.

In the drawings,

Figure 1 is a top plan view partly in section.

Figure 2 is a front elevation.

Figure 3 is a sectional view.

Figure 4 is a sectional view of a slight modification.

Figure 5 is a view partly in section and partly in elevation.

Referring to the drawings, the meter is indicated at 10 and the inlet and outlet pipes at 11 and 12 respectively. The pipes are provided with the usual connections 13 and 14, to which the present invention is applied.

The connection comprises a pair of duplicate thimble members 15 which are screw-threaded to engage the connections 13 and 14 and are also screw-threaded to receive connections from the gas main and house supply pipe indicated at 17 and 18 respectively.

In describing the thimbles as substantially similar or duplicates, it will be understood that in practice this will be the case, but not infrequently these parts may take different forms, which will not, however, affect this invention.

The thimbles 15 are provided with lateral extensions 19 which may be at substantially right angles to the bore of the thimble or can extend at any desired angle with respect thereto.

It will be understood that the thimbles and their extensions can be cast integrally and, therefore, the invention is capable of very extensive manufacture at relatively small cost.

In stating that the extensions 19 are integrally cast, it is clear that this will be the most inexpensive way of producing in quantity, but, obviously, the extensions may be made separate and united in any desired manner.

Each extension 19, at a point adjacent its free end, is provided with a recess 20 which terminates in an opening 21. The end walls of the recess and the bottom thereof are preferably rounded, while the side walls are straight, as shown in Figure 3 at 22, the rounded portion being indicated at 22' in Figure 5.

In the modification shown in Figure 4, the end walls and bottom are rounded, but the recess is enlarged so that its side walls instead of being straight, are cupped out or diverged to increase the width of the recess, as shown at 23. It will be understood, however, that the walls of the recess may have any desired contour, the purpose of the recess being hereafter described.

Where the walls of the recess are enlarged or diverged, it will be understood that the opening 21 may be correspondingly enlarged as shown best in Figure 5.

The recesses are adapted to receive eyebolts 24 as shown in Figure 5, the stem of the bolt passing through the opening 21 and being secured to the thimble extension by means of a nut 25.

The eye-bolts are shown as having circular eyes with correspondingly rounded exterior, but it will be understood that various shapes of eyes may be employed and the use of a rounded or circular eye is not the sole design which may be utilized. In other words, in some cases a square eye-bolt could be employed or one having a rounded bottom only.

The outer face of each extension is preferably enlarged and rounded adjacent the opening 21, as shown at 26, and, in fact, in this enlargement there is formed the opening 21, the recess being formed in the body portion of the extension. Of course, this is the specific construction and may be departed from, in that both the recess and opening may be formed within the body portion of the extension. The enlargement 26 is provided with a flat knob 27, upon which the nut 25 rests when it is tightened upon the threads of the eye-bolt.

It will be observed that the construction is a very simple one and the additional element employed for connecting the thimbles consists of a rod 28.

This rod has been illustrated as cylindrical, but may have a variety of forms.

A circular rod, however, is the simplest means, since it may be easily manufactured and passed through the circular openings of the eye-bolts previously described, at the same time permitting the thimbles, which will be connected to the rod, to be tilted laterally or rotated upon the rod as a pivot.

It will be understood that the eyes of the bolts 24 are adapted to receive the ends of this rod 28 and the ends of the rod will rest against and firmly contact with the inner faces of the extensions. To this end, in some cases, the extensions may be provided with longitudinal grooves, in which the rod may sit, but, since this is not essential, it is not illustrated in the drawings and will probably only be useful in unusual cases. The position of such a groove, of course, will be determined by the particular case, since it may be a straight longitudinal groove of various depths or made angular with relation to the extension.

In applying the invention, one way will be to position the thimbles upon the connections 13 and 14 and thereafter place the eyes upon the rod 28 and connect the parts by engaging the eyes in the respective recesses and openings of each thimble and loosely applying the nuts to the threaded ends of the bolts.

The connections 17 and 18 are then connected to the thimbles in the usual manner and the invention will be adjusted to meet various inequalities referred to.

For example, if the connections 13 and 14 or the connections 17 and 18 are out of alignment or have a different angular position, it will be readily seen that the thimbles may be laterally tilted or rotated with respect to each other upon the rod 28.

Longitudinal adjustment is obviously provided for, in that the thimbles are slidably connected to the rod 28.

Where a slight tilt vertically is required, due to the difference in length of the pipes, the parts have a sufficient play to permit vertical tilting of the thimbles with respect to each other and to the rod to compensate for such contingency.

Where the difference in length of the pipes is considerable, which is sometimes the case, the modified structure, shown in Figure 4, will be employed and the lateral enlargement of the side walls of the recess will permit the eye-bolts to tilt or pivot in the recess, so as to accommodate the connection to a situation where there is a considerable difference in length of the various pipes. After the thimbles have been connected to the various pipes so that the line is completed, the nuts 25 are tightly drawn upon the eye-bolts to engage the flattened knob portion 27 and draw the eye-bolts tightly into position, in engagement with the recess. The size of the eye-bolt is preferably such that when the nuts are tightened, the rod 28, at its ends, will firmly contact with the inner side of each extension and thus be securely held in line contact.

Of course, if a longitudinal groove is provided, the size of the eye-bolts will be such as to draw the rod into such groove, but this is not the preferred construction and has not been illustrated.

The invention is a very simple one and is capable of very simple application, reducing to a minimum the difficulties heretofore found in connection with constructions of this character, which have been weak and unsatisfactory. It will be seen that the parts are readily removable without disturbing the thimbles, which is sometimes of importance.

The connection will act as a strain reliever and in many cases a stationary shelf may be eliminated.

By providing for the various adjustments in the manner shown, no strain is put upon any particular part, but is equally distributed upon the thimbles, their extensions, and the rod and its connecting means which is a matter of vital importance with this type of device.

Various modifications may be made, but they will be considered as within the scope of the invention which is covered in the appended claims.

It will be understood that the extensions on the thimbles may be on the same side of the rod 28, instead of upon opposite sides, as illustrated in the drawings. This, of course would merely require that the extensions be formed on the thimbles so as to be in alignment instead of out of alignment, as in the disclosure.

What I claim is:

1. In a device of the class described, thimbles for connection to a meter and to the inlet and outlet supply pipes, said thimbles having lateral extensions, recesses formed in said extensions terminating in openings, eye-bolts received in said recesses and extending through said openings, and a rod adapted to be received in the eyes of said bolts and drawn into firm contact with said extensions by tightening the eye-bolts in the recesses.

2. In a device of the class described, thimbles for connection to a meter and to the inlet and outlet supply pipes, said thimbles having integral extensions, each extension having a flat surface provided with a recess terminating in an opening, eye-bolts seated in each recess and extending through each opening and a cylindrical rod adapted to engage said eye-bolts and to be drawn into firm engagement with the flat side of said extensions when the eye-bolts are tightened within the recesses.

3. In a device of the class described, thimbles, a lateral extension thereon, a recess formed in said extension, one face of the extension being provided with a projecting portion having a flattened surface, the said recess terminating in an opening extending through said projecting portion.

4. In a device of the class described, thimbles for attachment to a meter and to the inlet and outlet supply pipes, said thimbles having extensions thereon, a one-piece rod for connecting said thimbles, and means pivotally mounted on said extensions for slidably receiving an end of the rod, whereby said rod is slidably mounted with respect to said extensions and pivotally movable about an axis at right angles to the axis of the rod.

In testimony whereof I have hereunto set my hand.

JAMES T. SUTLIFF.